United States Patent
Adams et al.

(10) Patent No.: US 8,867,874 B2
(45) Date of Patent: Oct. 21, 2014

(54) METHOD FOR MODIFYING THE COMBINING OR SPLITTING RATIO OF A MULTIMODE INTERFERENCE COUPLER

(71) Applicant: Finisar Sweden AB, Jarfalla (SE)

(72) Inventors: Dave Adams, Stockholm (SE); Jan-Olof Wesstrom, Stockholm (SE)

(73) Assignee: Finisar Sweden AB, Jarfalla (SE)

( * ) Notice: Subject to any disclaimer, the term of this patent is extended or adjusted under 35 U.S.C. 154(b) by 0 days.

(21) Appl. No.: 13/706,658

(22) Filed: Dec. 6, 2012

(65) Prior Publication Data

US 2014/0161388 A1  Jun. 12, 2014

(51) Int. Cl.
*G02B 6/26* (2006.01)
*G02F 1/00* (2006.01)
*G02B 6/28* (2006.01)
*G02B 6/293* (2006.01)

(52) U.S. Cl.
CPC ............ *G02B 6/2804* (2013.01); *G02B 6/2813* (2013.01); *G02B 6/26* (2013.01); *G02B 6/29344* (2013.01); *G02F 1/00* (2013.01)
USPC ................... 385/27; 385/14; 385/15; 385/28; 385/31; 385/39; 385/40; 385/48; 385/50

(58) Field of Classification Search
CPC ....... G02F 1/00; G02F 1/0009; G02F 1/0063; G02F 1/0072; G02F 1/009; G02F 1/011; G02F 1/0128; G02F 1/0131; G02F 1/0134; G02F 1/0147; G02F 2203/58; G02F 2202/022; G02F 2001/00; G02F 2001/01; G02F 2001/35; G02B 6/2813; G02B 6/29344; G02B 6/29331; G02B 6/29395
USPC .......................................... 385/14–15, 39–52
See application file for complete search history.

(56) References Cited

U.S. PATENT DOCUMENTS

| | | | |
|---|---|---|---|
| 5,689,597 A | 11/1997 | Besse | |
| 5,732,179 A * | 3/1998 | Caneau et al. | 385/131 |
| 6,353,694 B1 * | 3/2002 | Paiam | 385/39 |
| 6,385,362 B1 * | 5/2002 | Norwood | 385/14 |
| 6,571,038 B1 | 5/2003 | Joyner et al. | |

(Continued)

FOREIGN PATENT DOCUMENTS

WO    2011/043718    4/2011

OTHER PUBLICATIONS

MM Interference Couplers w Tunable Power Splitting Ratios, Juerg Leuthold, Journal of Lightwave Technology, vol. 19, No. 5, May 2001, pp. 700-707.*

(Continued)

*Primary Examiner* — Ryan Lepisto
*Assistant Examiner* — Guy Anderson
(74) *Attorney, Agent, or Firm* — Young & Thompson

(57) ABSTRACT

Method for modifying the splitting or combining ratio of a first multimode interference (MMI) coupler (100), which first coupler is arranged to convey light from one or several input waveguides to one or several output waveguides, wherein a film (103*a*) of a material is arranged over the first coupler, wherein the film is strained so that a force is applied by the film to the surface of the first coupler, and so that the refractive index profile in the material of the first coupler changes as a consequence of the force, and wherein the splitting or combining ratio is modified as a consequence of the changed refractive index profile.

20 Claims, 6 Drawing Sheets

(56) References Cited

U.S. PATENT DOCUMENTS

| | | | |
|---|---|---|---|
| 6,684,019 B1* | 1/2004 | Norwood et al. | 385/129 |
| 8,532,447 B1* | 9/2013 | Kwakernaak et al. | 385/31 |
| 2006/0093369 A1* | 5/2006 | Nagarajan | 398/135 |
| 2006/0203858 A1* | 9/2006 | Arimoto | 372/20 |
| 2009/0203858 A1* | 8/2009 | Grass et al. | 526/126 |
| 2011/0158653 A1* | 6/2011 | Mazed | 398/140 |
| 2012/0063716 A1* | 3/2012 | Mizuno et al. | 385/11 |
| 2013/0039664 A1* | 2/2013 | Clifton et al. | 398/200 |

OTHER PUBLICATIONS

MM interference waveguide switch of elctro-optic polymer with atpered access wavegudies, Yu et al, Physics Procedia, vol. 14, (2011) pp. 25-28.*

* cited by examiner

METHOD FOR MODIFYING THE COMBINING OR SPLITTING RATIO OF A MULTIMODE INTERFERENCE COUPLER

BACKGROUND OF THE INVENTION

1. Field of the Invention

The present invention relates to a method for modifying the combining or splitting ratio of a multimode interference coupler, as well as a corresponding method for modifying the combining or splitting ratio of a circuit comprising several such couplers. It also relates to a coupler comprising a strained film.

2. Description of the Related Art

Multimode interference (MMI) couplers are well-known in the art, and are for instance used as combiners and splitters in integrated optical circuits. Light launched into an access port of an MMI coupler traverses the length of the MMI region in several modes towards one or several output ports at an opposite side of the coupler. Because of the self-imaging effect of the coupler, its geometry can be determined so as to give rise to a certain light intensity distribution at the output port or ports for certain wavelengths. In its function as a combiner, the coupler comprises at least two input ports. As a splitter, the coupler comprises at least two output ports. A frequently used configuration is a 2×2 MMI coupler, comprising two input ports and two output ports.

In a 2×2 MMI coupler, it is customary to designate the transmission from an input port to an output port that is situated on the same side of the coupler centerline as the bar state transmission, and to designate transmission to an output port situated on the other side of the coupler centerline as the cross state transmission.

In many applications, it is desirable for a 2×2 MMI coupler to have a combining or splitting ratio of 1. The splitting ratio of a 2×2 MMI coupler for light that is launched from one of the input ports can be defined as the power transmitted in the cross state divided by power transmitted in the bar state. For example, the splitting ratio is the cross output power divided by the bar output power. In the case of a splitter with two output ports, a splitting ratio of 1 thus implies a symmetric division of light power between the output ports. A ratio of 1 is desirable for example where the coupler is used in a Mach-Zehnder interferometer based modulator for laser communication, such as the one described in WO 2011/043718 A1.

However, once an MMI coupler has been manufactured, for instance as a part of an integrated optical circuit, it is difficult to correct any deficiencies of the coupler negatively affecting the resulting splitting or combining ratio.

Several methods have been proposed to control the splitting and/or combining ratio of MMI couplers:

U.S. Pat. No. 5,689,597 discloses a so-called butterfly-shaped or inverse butterfly shaped 2×2 port optical MMI coupler, which achieves asymmetric splitting or combining. The transmission properties of a butterfly MMI are a sensitive function of the MMI dimensions, where for example only a 0.2 um change in the maximum or minimum width of the MMI can have a very large influence on the combining or splitting ratio. Accordingly, it is difficult to alter the combining or splitting ratio of a butterfly MMI coupler after it has been fabricated by subsequent modifications of the MMI shape.

U.S. Pat. No. 6,571,038 describes different methods for achieving a tunable splitting ratio in a 2×2 port MMI coupler, such as by placing electrodes at the location of optical images in the MMI and injecting current there. This requires the application of electrodes on the coupler, along with the additional cost and energy consumption of such injection, as well as control circuitry and space requirements for the accommodation of such circuitry. Another variant according to this document is to illuminate locations of optical images in the MMI with a light beam. This requires the presence of an apparatus to generate and focus a light beam onto the said locations.

The article Trung-Thanh Le and Laurence W. Cahill, "The Design of SOI-MMI Couplers with Arbitrary Power Splitting Ratios Using Slotted Waveguide Structures", LEOS Annual Meeting Conference Proceedings, 2009 proposes an asymmetric 2×2 splitter or combiner fabricated with a deeply etched slot along the length of the MMI, at or near the center of the MMI. The slot must have optically smooth sidewalls and a precisely controlled depth, and it should also have a flat bottom surface, in order to achieve the desired splitting ratio while keeping scattering loss and reflections to a minimum. This not only results in more complicated manufacturing, but also limits the possible material systems.

SUMMARY OF THE INVENTION

The present invention provides for a way to modify the splitting and/or combining ratio of an MMI coupler in a simple and inexpensive way, and especially provides a way to correct the splitting and/or combining ratio of an existing such coupler, in order to achieve a combining or splitting ratio of 1 for the coupler.

Hence, the invention relates to a method for modifying the splitting or combining ratio of a first multimode interference (MMI) coupler, which first coupler is arranged to convey light from one or several input waveguides to one or several output waveguides, wherein a film of a material is arranged over the first coupler, which film is strained so that a force is applied by the said film to the surface of the first coupler, and so that the refractive index profile in the material of the first coupler changes as a consequence of the said force, and wherein the said splitting or combining ratio is modified as a consequence of the said changed refractive index profile.

Furthermore, the invention relates to a multimode interference (MMI) coupler, which coupler is arranged to convey light from one or several input waveguides to one or several output waveguides, where the circuit comprises a film of a strained material arranged over the coupler and arranged to apply a force to the surface of the coupler, and so that the refractive index profile in the material of the coupler, and as a consequence also the splitting or combining ratio of the coupler, is different as a consequence of the said force as compared to the case without said force.

BRIEF DESCRIPTION OF THE DRAWING FIGURES

In the following, the invention will be described in detail, with reference to the enclosed drawings, where FIGS. 1a, 1b and 1c are respective lateral cross-sections of prior art MMI couplers with different waveguiding layers arrangements;

DETAILED DESCRIPTION OF THE INVENTION

Figure 1A:
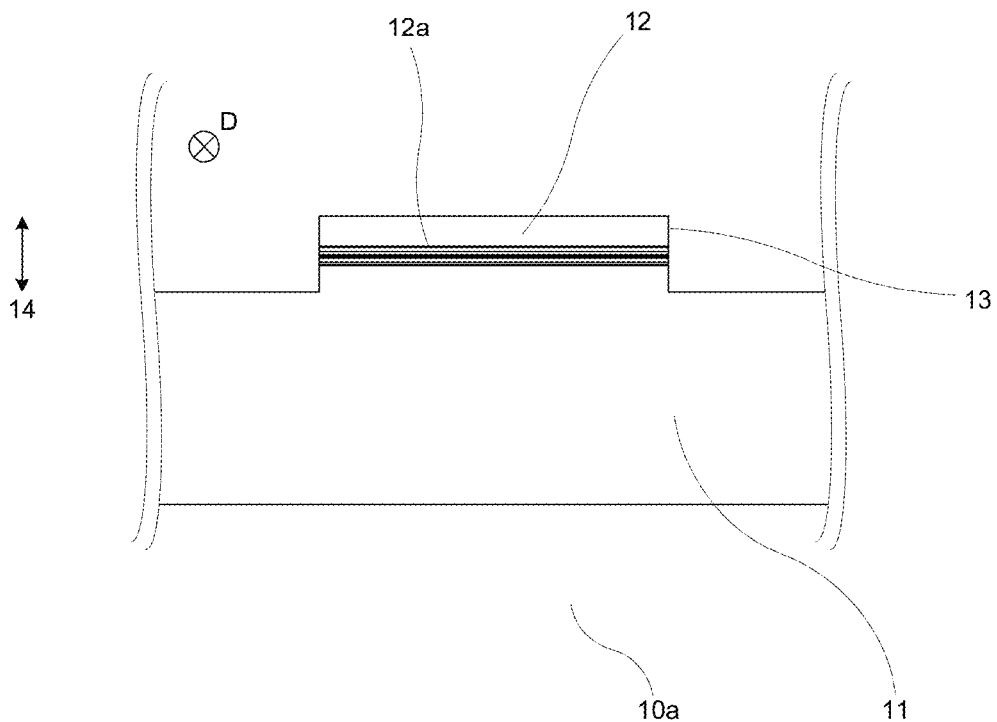
FIGS. 1d and 1e are lateral cross-sections of MMI couplers according to the invention, wholly and partly, respectively, covered by a film of a strained material.

FIG. 1a is a simplified lateral cross-section, i.e. a section which is perpendicular to the direction of light propagation, of a prior art 2×2 MMI coupler 10a. The cross-section is taken through the multimode region 12 of the ridge waveguide 13 of the coupler 10a, between the input and output ports. The coupler 10a is arranged on a substrate 11, from which the ridge 13 protrudes a distance 14. As is conventional as such for such MMI couplers, the light modes propagate along the ridge waveguide 13, with vertical confinement of the light provided by one or more vertical waveguiding layers 12a, and lateral confinement provided by the sidewalls of the MMI. The waveguiding layers are characterized by a higher index of refraction that the layers situated above and below, which are typically referred to as the cladding layers. In general, the propagating light is partly contained within the ridge itself, and may also extend partly into the optical material beneath the ridge. The direction of light propagation D is into the plane of FIG. 1a. The letter D is consistently used throughout the drawings to denote the principal direction of light propagation through a component.

Figure 1B:
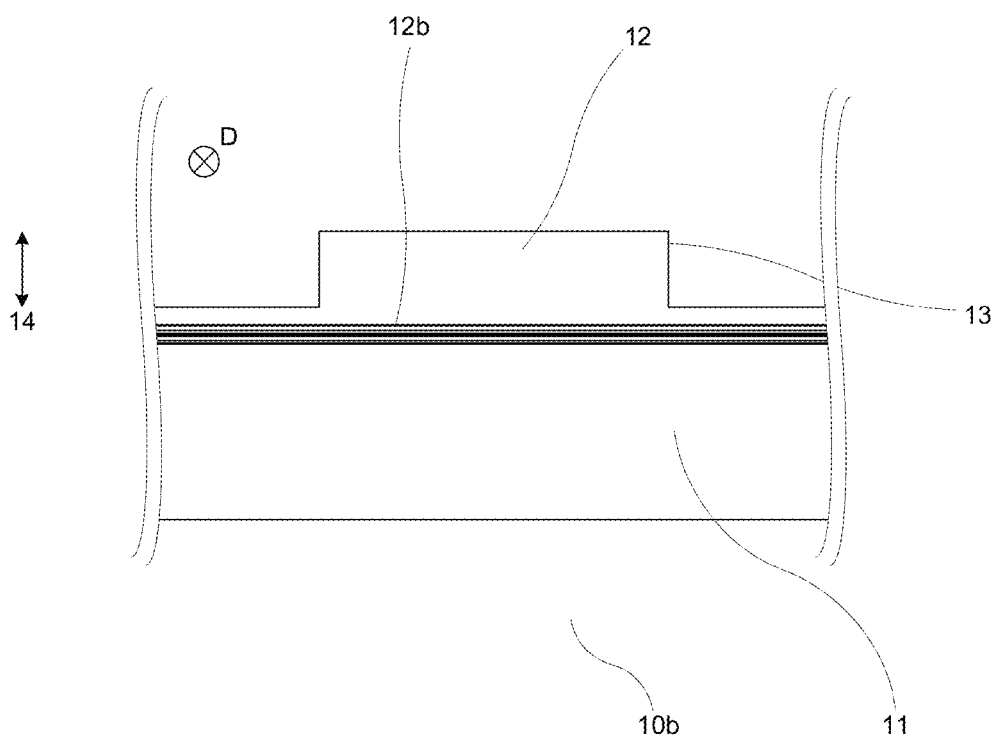

An MMI coupler 10b with an alternative MMI cross section is shown in FIG. 1b, where the layer or layers 12b that provide the vertical waveguiding are situated below the base of the ridge, rather than within the ridge. This MMI geometry results in weaker lateral waveguiding than in FIG. 1a. In this geometry, a portion of the vertically guided light extends up into the ridge material.

Figure 1C:
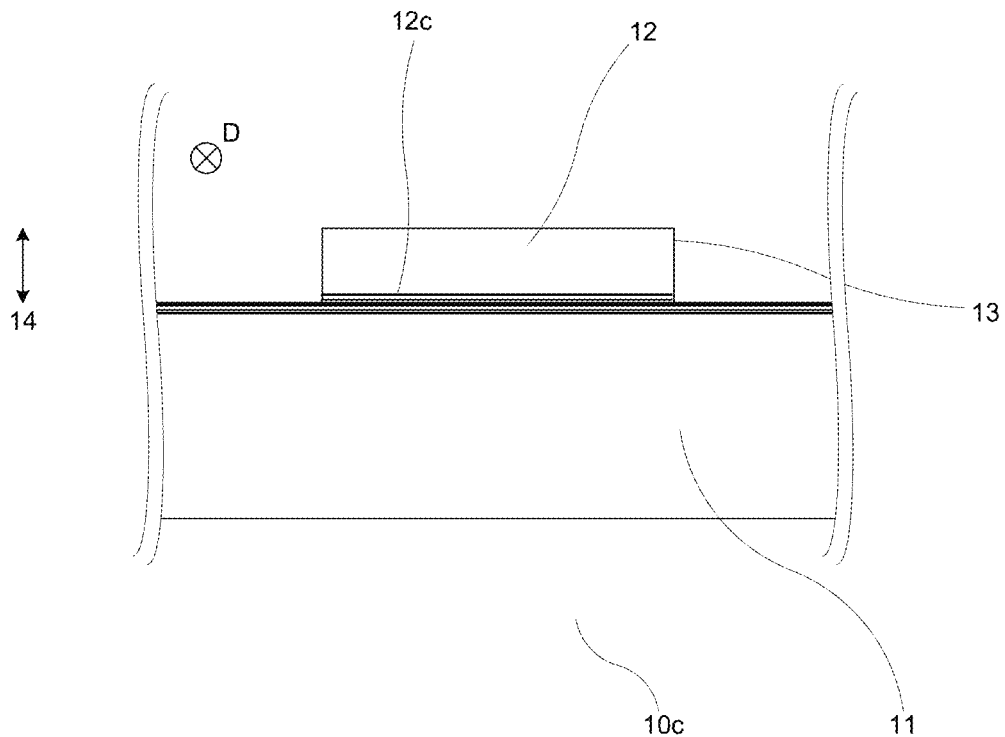

Still an alternative MMI coupler 10c with an MMI cross section is shown in FIG. 1c, where the layer or layers 12c that provide the vertical waveguiding are vertically arranged so that the base of the ridge that defines the MMI width is located within the vertical waveguiding layer or layers 12c.

Apart from the position of waveguiding layers 12a, 12b and 12c, couplers 10a, 10b and 10c of FIGS. 1a, 1b and 1c are identical and share reference numerals. It is realized that the present invention is applicable to each of the types of couplers illustrated in FIGS. 1a, 1b and 1c.

The couplers according to the invention are preferably, as is the case of the coupler 10a, designed as ridge waveguides 13, and are preferably also formed on the same semiconductor substrate and share the same or substantially the same material structure as other optical components on the same optical semiconductor circuit as the coupler. The substrate 11 and the ridge 13 may incorporate stacks of different material layers, in order to achieve desirable optical properties in terms of light propagation, optical gain, losses and so forth, which considerations are conventional as such. It is preferred that the couplers on the same integrated optical circuit or wafer are formed on the same semiconductor substrate and share the same or substantially the same material structure. This is preferably the case both for the substrate 11 and the ridge 13.

The operation of a 2×2 port interference MMI coupler that operates as a splitter or combiner involves the propagation of many modes within the multimode region, but the operation of a 2×2 coupler according to the invention can be understood by considering the amplitudes of the two lowest order modes that are excited by the light injected at one launch port for the specific case of a 2×2 coupler designed to operate in the restricted paired interference regime.

In this design regime, for a 2×2 MMI having an effective optical width $W_{eff}$, the light is launched substantially along an axis that is laterally displaced from the centerline of the MMI by $$-\frac{W_{eff}}{6}$$

for one input port, and $$+\frac{W_{eff}}{6}$$

for the other input port. $W_{eff}$ is approximately equal to the physical width of the MMI in the case of an MMI having strongly guiding sidewalls. The preferred length of the MMI is approximately equal to $$\frac{2N_{guide}W_{eff}^2}{3\lambda_0},$$

where $\lambda_0$ is the free space radiation wavelength, and where $N_{guide}$ is the effective refractive index of light that is propagating within the vertical 1 dimensional slab mode that corresponds to the given combination of vertical waveguide and cladding layers.

In this type of 2×2 coupler, light launched by fundamental mode light from one input port typically excites the fundamental and first higher order mode within the MMI region to a greater extent than the excitation of all other propagating modes.

Figure 2A:
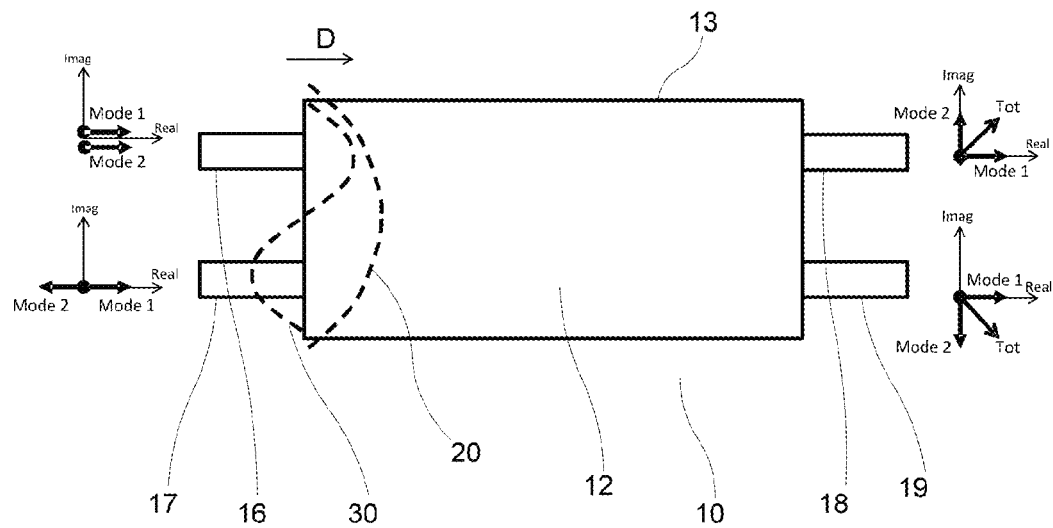
FIG. 2a is a simplified, conceptual top view of the prior art 2×2 MMI coupler of FIG. 1a, explaining the light propagation through this coupler.

FIG. 2a illustrates, in a simplified top view, the optical power splitting in the prior art 2×2 restricted paired interference MMI coupler 10a, through which light propagates in the direction D, through the MMI region 12 when the light is launched from the input waveguide 16 to a pair of output waveguides 18, 19. 17 is another input waveguide. We now consider the two lowest order modes 20, 30 propagating through the MMI region 12.

With the launch of light into one the input ports of one 16 of the waveguides, the initial excitation of modes in the MMI region 12 is a superposition of these two modes 20, 30. This modal superposition within the MMI region 12 approximately reproduces the light that is launched at the illuminated input port, and results in approximately zero amplitude at the other input port, via which the waveguide 17 is connected to the MMI region 12. Of course, only a coarse reconstruction of the launched mode at the start of the MMI region 12 is achieved at the illuminated input port, along with an imperfect zero at the other input port, because in this simplified illustration of the coupler operation we have considered only the two lowest order modes within the MMI region 12, rather than all available propagating and radiation modes that are available within the MMI region 12.

When these modes 20, 30 have propagated to the far end of the MMI region 12, the phase relationship between the modes 20 and 30 results in a symmetric division of light power between the respective output ports of waveguides 18, 19. The complex number coordinate systems in connection to each waveguide 16, 17, 18, 19 illustrate the situation at the port of each respective waveguide 16, 17, 18, 19.

Figure 1D:
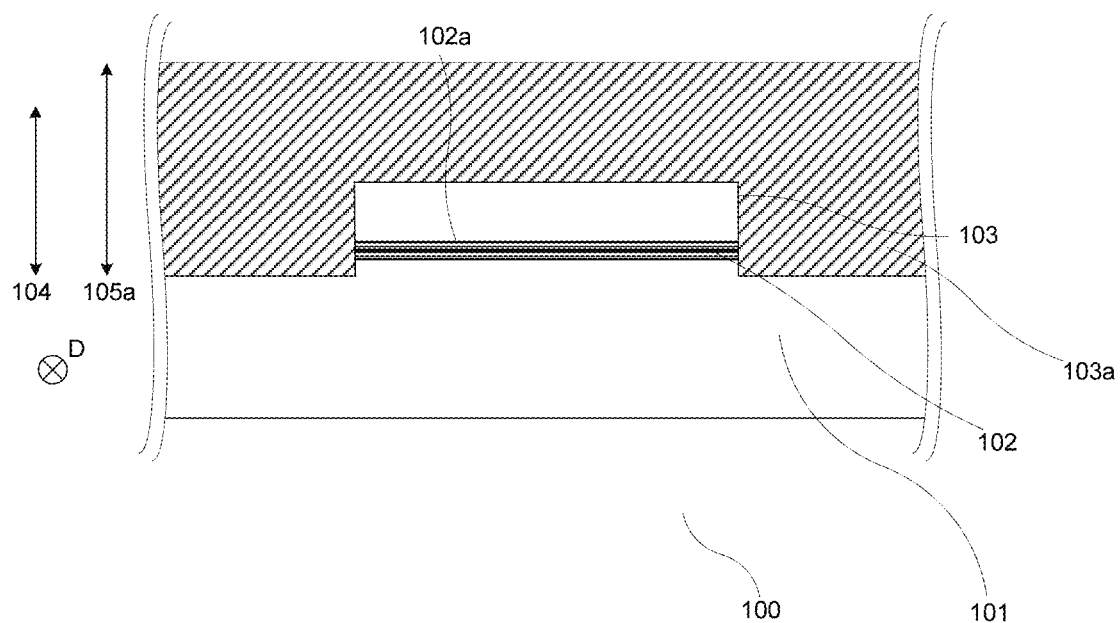
Figure 1E:
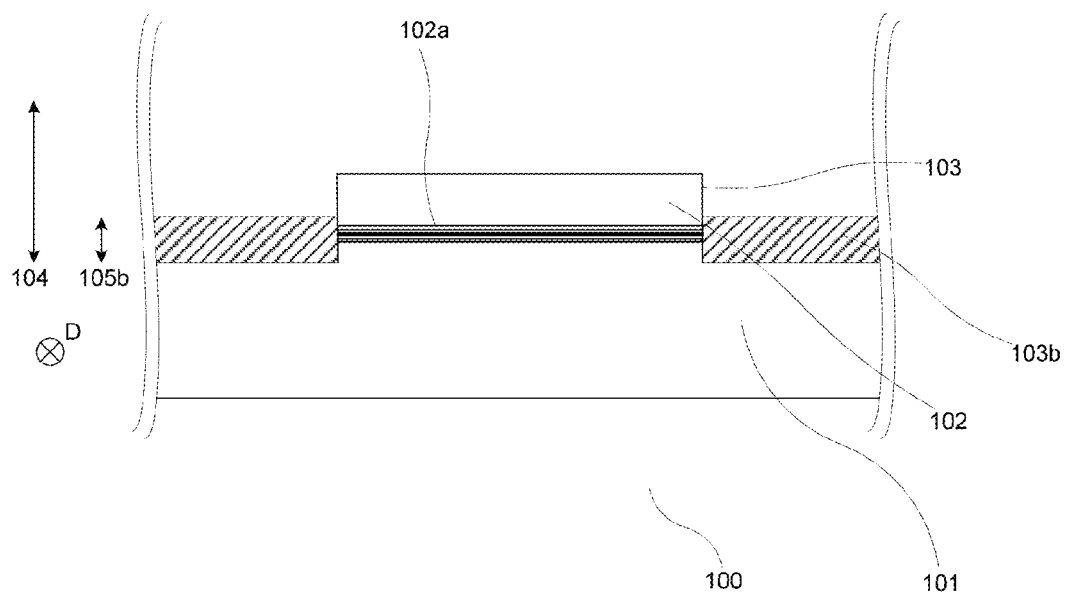

FIGS. 1d and 1e are similar to FIG. 1a, but show a cross-section of two different exemplary MMI couplers 100 according to the invention. FIGS. 1d and 1e share reference numerals for corresponding parts. Hence, the coupler 100 is arranged on a substrate 101 on which a ridge structure 103 is arranged. FIGS. 1d and 1e, similarly to FIG. 1a, show a respective lateral cross-section through the MMI region 102 of the coupler. The ridge 103 protrudes a certain distance 104 from the substrate surface. The distance 104 is preferably less than 10 μm, most preferably between 1 and 5 μm.

Figure 2B:
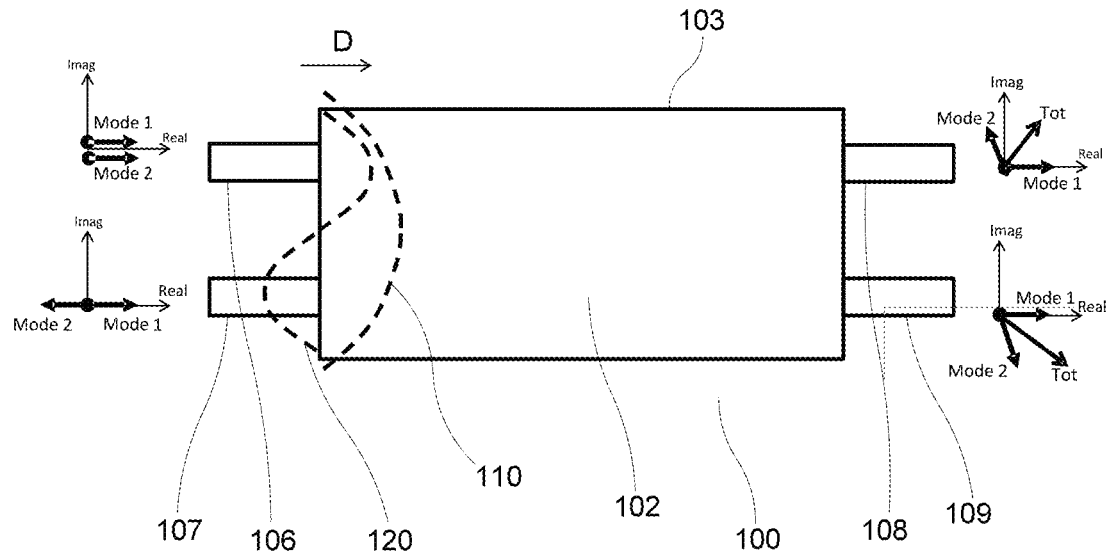
FIG. 2b is a simplified, conceptual top view explaining the light propagation in either one of the MMI couplers according to FIG. 1d or 1e, with a film of a strained material.

Furthermore, FIG. 2b corresponds to FIG. 2a, and shows, in a similar manner and with reference numerals shared with FIGS. 1d and 1e, a simplified top view of the MMI coupler 100. The coupler 100 is arranged to convey light incident from input waveguides 106, 107, via corresponding input ports, into the MMI region 102, and again out through output waveguides 108, 109, via corresponding output ports. Again, the two most fundamental modes 110, 120 are considered for ease of understanding. Complex number coordinate systems show the light at each of the respective ports.

According to the invention, and as shown in the simplified and exemplary embodiments of FIGS. 1d and 1e, a film 103a, 103b of a certain material is arranged over the coupler 100. In FIG. 1d, the film 103a is arranged in a relatively thick layer, of thickness 105a from the substrate 101 surface, so that the complete ridge structure 103 is covered by the material 103a. In FIG. 1e, the material 103b is arranged in a shallower layer, of thickness 105b, so that the ridge structure 103 is only partly covered by the film 103b, effectively protruding above the film 103b as viewed from the side as in FIG. 1e. The thickness 105a is preferably between 20% and 200% of the distance 104. In both FIGS. 1d and 1e, 102a denotes the waveguiding layers 103a as shown in FIG. 1a.

According to the invention, the material of the film 103a, 103b is mechanically strained, so that a force is applied by the film 103a, 130b to the surface of the coupler 100. The force can be a tension or a compression force, or a combination of the two across different parts of the coupler 100, resulting in a non-uniform mechanical stress field within the material of the MMI region 102.

Such strain can be accomplished in different ways, including depositing the film 103a, 103b material in a relaxed, unstrained state, on top of the coupler 100 at a first temperature, after which the temperature is changed to a second temperature so that the deposited film material shrinks or expands as a consequence of the change in temperatures. For example, a polymer can be used which when deposited at a first, higher temperature will shrink when the temperature drops to the second, lower temperature, thereby exerting a force onto the surface of the geometric structure of the substrate 101 and the ridge structure 103 as a consequence of said shrinking. In similar ways, it is possible to use a material which expands under a temperature change.

However, for some types of film materials, the chemical bonds between the film and the semiconductor surfaces, and/or the bonds formed within one or more of the films that have been deposited onto or attached to the semiconductor surfaces, can cause mechanical strain within the semiconductor without being subjected to a subsequent temperature or material property change, even if the film material is deposited in solid state, such as for instance by evaporation. If such materials and deposition techniques are used, no subsequent method step after the deposition itself will thus be necessary.

As a third option, it is possible to use a material which shrinks or expands as a consequence of curing or any other physical process, which process permanently modifies at least one material property of the film material and which process is applied in a processing step after an initial deposition of the unstrained or strained film material. In this case, the permanent change of the said at least one material property has the direct or indirect consequence of shrinking or expanding the film material, leading to similar results as a changed temperature with respect to MMI strain. Hence, as an alternative or addition to a film material with built-in strain or a subsequent temperature changing step, subsequent processing steps aiming at permanently modifying at least one material property of the deposited or attached film materials comprise optical or chemical curing, heat treatment, ion bombardment, intermixing, reflow, diffusion, and ion implantation.

A variety of methods can be used to deposit or attach one or more films of various material types onto semiconductor surfaces, for example by spinning, sputtering, soldering, crystal growth, flame hydrolysis, wafer bonding, electro-plating, ion beam deposition, evaporation (comprising ion assisted and plasma assisted), chemical vapour deposition (CVD), or plasma enhanced CVD.

Suitable film materials comprise, but are not limited to dielectrics, polymers, metals, crystals and glasses. In particular, preferred materials comprise benzocyclobutene (BCB), silicon dioxide ($SiO_2$), silicon Nitride (SiN), silicon oxide (SiOx), silicon oxy nitride (SiOxNy), photopolyemide, or combinations thereof.

The skilled person realizes that the resulting net strain pattern onto the MMI from the film or stack of films will depend on the film thicknesses, deposition conditions and routine.

As a consequence of said force imparted onto the coupler 100, the refractive index profile in the material of the coupler 100 will change, especially in the MMI region 102 and especially within and adjacent to the waveguiding layers 12a, 12b, 12c, 102a. According to the invention, the splitting or combining ratio of the coupler 100 is modified as a consequence of this changed refractive index profile, and will thus be different than the splitting or combining ratio of the corresponding coupler 10 without a strained film. In other words, the splitting or combining ratio of a multimode interference (MMI) coupler is modified by the arrangement of the strained film 103a, 103b.

With the strained film in place, the refractive index profile of the optical MMI material is modified more strongly along the outer edges of the MMI region 102 than in the center. As a result, while all modes are affected by the index change, the higher order mode 120 is more strongly affected than the fundamental mode 110, because a greater proportion of its power distribution is located close to the MMI region 102 sidewalls.

Accordingly, the phase relationship of the two modes 110, 120 when these arrive at the output end of the MMI region 102 will be modified as compared to the case illustrated in FIG. 2a, where there is no strained film. Specifically, for a film 103a, 130b that applies tension force to the MMI region 102, the constructive interference of the two modes 110, 120 generally results in greater power for the cross state transmission than for the bar state transmission, as illustrated by the complex number coordinate systems in FIG. 2b.

Thus, the application of a strained film according to the invention provides an inexpensive method for modifying the splitting and/or combining ratio of an MMI coupler, not requiring any of the difficult or expensive methods and peripheral equipment used in the prior art described initially. Specifically, neither fabrication nor operation of control electrodes is required, and no illumination by external light beams is required. In the preferred embodiment that the strained film 103a, 130b that covers the MMI region 102 also extends laterally away from the coupler 100, no critical alignment of the film pattern with respect to the MMI region 102 is required during fabrication.

The present invention can advantageously be applied to an MMI coupler 100 having two input waveguides 106, 107 and/or two output waveguides 108, 109, preferably a 2×2 MMI coupler.

Especially preferred is to apply the invention to such an MMI coupler, in such a way so as to retroactively correct the splitting or combining ratio in case a previous production step resulted in an MMI coupler with a splitting or combining ratio which was outside of a desired target range. Preferably, the above described modification of the splitting or combining ratio is carried out so that the splitting or combining ratio changes towards a value of 1.

It is furthermore preferred that the method step described herein of arranging a strained film over an existing MMI coupler is used as a one-time method step with the aim of permanently modifying or trimming the splitting and/or combining ratio of the said MMI coupler.

Hence, the present invention can be used within the production of MMI couplers, as an inexpensive post-processing method step for trimming or modifying the splitting and/or combining ratio of MMI couplers, such as after on-wafer testing or as a response to a request for a customization of certain MMI couplers, before shipping the manufactured products, as well as to retroactively correcting the performance of produced MMI couplers that do not satisfy certain set requirements. Such trimming will be permanent and will not require any other arrangements in order to maintain the ratio modification over time.

It is preferred that the strained film 103a, 103b is applied over the entire length of the MMI region 102 in the direction D. Thus, the film 103a would preferably cover the whole width, preferably wider than the width, and preferably also the whole length, of the MMI region 102 as shown in FIG. 2b. In the partially covered case, the film 103b would surround the whole MMI region 102 in FIG. 2b, with the top surface of the MMI region 102 and possibly also the waveguides 106-109 protruding from above the surface of the film 103b. That the film 103a, 103b is applied over the entire length of the MMI region 102 results in the effect of the film strain also being distributed over the entire length of the MMI region 102, and as a consequence the required change in refractive index of material in the MMI region 102 to obtain a certain magnitude of modification in the coupler splitting or combining ratio can be substantially smaller than the change in index that must be achieved for the same ratio modification when that index change must be achieved by actions focused at a few optical image spots within the MMI region 102.

Whereas the film 103a, 103b can have a net tensile or compressive effect on the MMI region 102, it is possible that it applies tensile forces onto certain parts of the MMI region 102 and compressive forces onto certain other parts thereof, depending on the exact geometry of the application and on the material properties, in terms of elasticity etc., of the film 103a, 103b material. Specifically, in some applications it is advantageous to apply multiple layers of the same or different film materials, one on top of the other. Possibly, an etching step such as the one described below may be applied between the applications of consecutive layers of film material, so that different layers of material have different coverage in relation to the coupler 100. This way, the exact effect of the strained film can be tailor made by varying film coverage, depth and/or composition across the surface of the MMI coupler 100, possibly in combination with one or several intermediate or finalizing etching steps across selected parts of the coupler 100 or across its entire surface.

Hence, according to a preferred embodiment, the film 103a, 103b is partly etched away after being arranged over the coupler 100, so that the force exerted onto the MMI region 102 as a consequence of the film material strain is different after said etching away as compared to the same situation without etching. Such etching may for instance comprise etching away the film 103a completely over one or several areas of the coupler 100, resulting in a film 103b like the one illustrated in FIG. 1e, where the MMI region 102 and possibly other components, such as waveguides 106-109, protrude a certain distance above the film 103b surface. Alternatively, the etching may result in the film merely being somewhat thinner, so that the thickness 105a, 105b decreases.

Figure 3A:
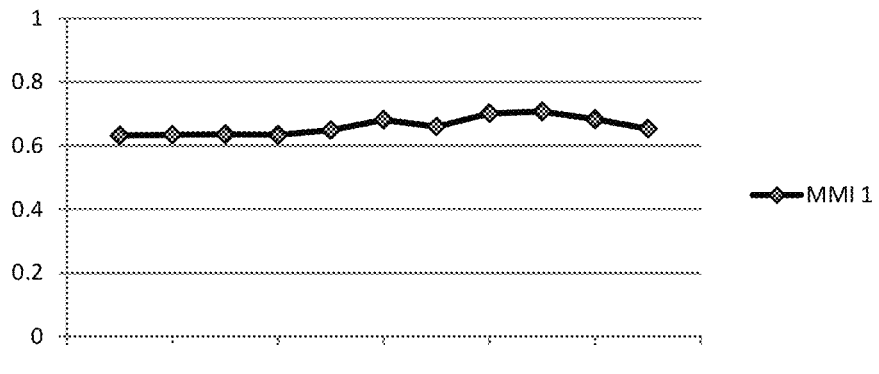
FIGS. 3a, 3b and 3c are graphs showing measured combining ratios for an MMI coupler fully (FIG. 3a), partly (FIG. 3b) and not (FIG. 3c) covered by a film of strained material.
Figure 3B:
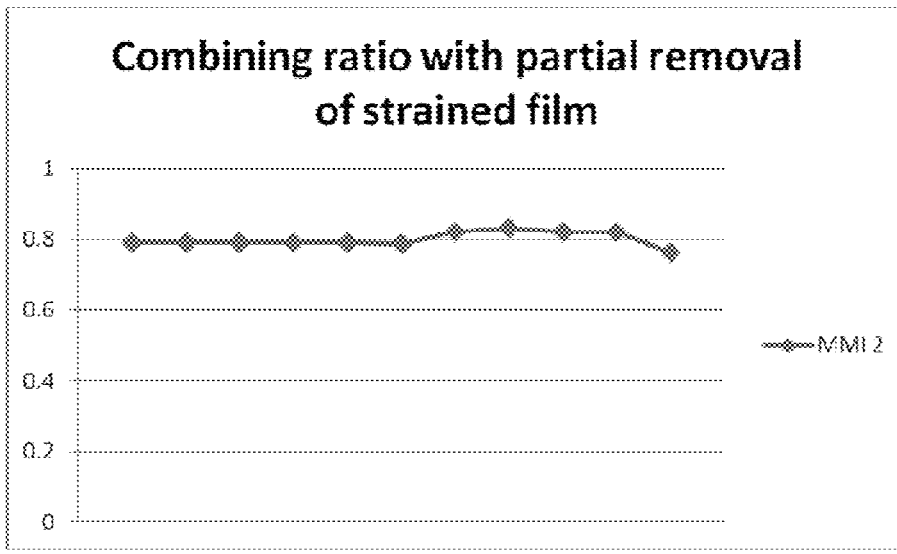
Figure 3C:
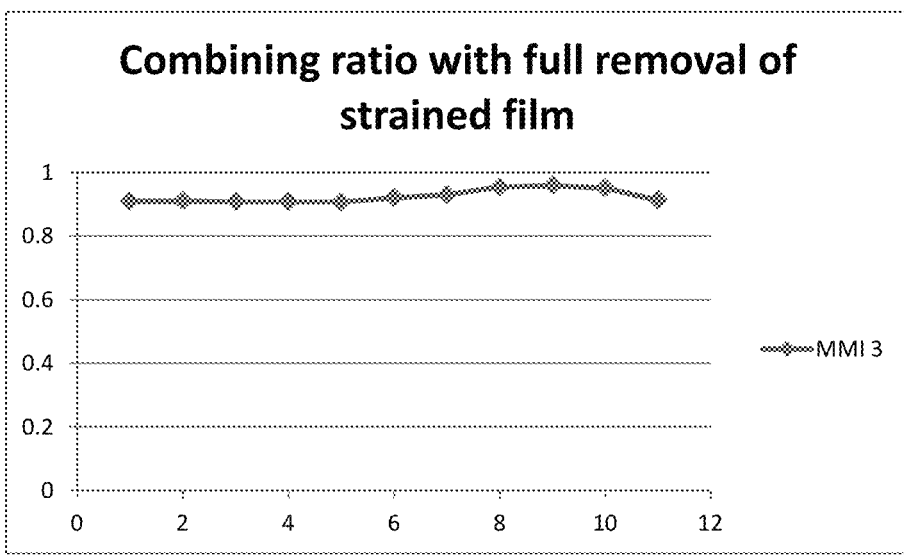

FIGS. 3a, 3b and 3c are graphs showing experimental measurement data of the combining ratio (Y axis) of three different 2×2 MMI optical combiners as a function of optical frequency (X axis, unspecified scale but approximately covering the conventional fiber communications C-band, in other words frequencies corresponding to wavelengths of 1.53-1.57 μm). FIG. 3a shows the combining ratio versus optical frequency for an MMI coupler which is fully encapsulated by a strained film according to the invention. FIG. 3b is a corresponding graph when the film is partly etched away, and FIG. 3c shows the combining ratio when the film is entirely etched away, all three graphs covering the same range of optical frequencies. It should be noted that FIG. 3c represents the conventional case, with no strained film present.

It is clear from FIGS. 3a-3c that the choice of film thickness affects the combining ratio of the combiner, and that a reasonably flat combining ratio is maintained over the entire C-band for all three cases. In the experiment illustrated in FIGS. 3a-3c, the combining ratio decreased in a direction away from 1 as a result of increased film thickness. However, it is clear that such a decrease may be useful for instance if the combining ratio is higher than desired in the absence of a strained film. Alternatively, a film material with opposite strain properties could be used in the illustrated case to instead increase the combining ratio from a value below 1.

Figure 4:
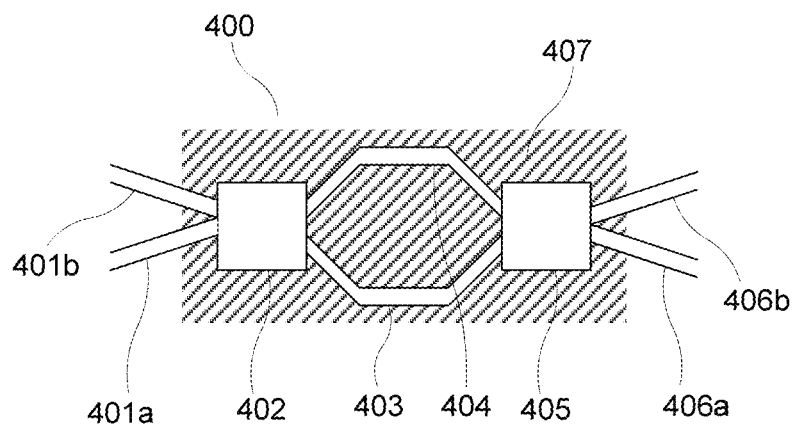
FIG. 4 is a simplified view of an integrated circuit according to the present invention, comprising several MMI couplers.

The present invention can particularly advantageously be applied in one and the same method step to several MMI couplers, arranged as parts of the same integrated optical circuit. This situation is illustrated in FIG. 4, wherein a simplified Mach-Zehnder modulator 400 circuit exemplifies such a circuit. It is realized that, in practical applications, considerably more complicated and larger circuits can be treated in an analogue manner. The circuit 400 comprises input waveguides 401a, 401b, a first 2×2 MMI coupler in the form of a splitter 402, two intermediary waveguides 403, 404, a second 2×2 MMI coupler in the form of a combiner 405, and two output waveguides 406a, 406b. A film 407 of a polymer material is deposited, in a first step, across the complete surface of the circuit 400, including all of its components. Thereafter, in a second optional step, the film 407 is etched down to a certain depth over a portion of or the whole of the MMI region of one or both 2×2 MMI regions, so that, where the etch has been applied, the waveguides and couplers 401-406, all of which protrude from the substrate surface, also protrude from the surface of the film 407, as described above.

Many times, the MMI couplers comprised in a circuit such as the one shown in FIG. 4, which has been manufactured as a unit, will suffer from similar or identical performance issues in terms of splitting and/or combining ratios. This is in particular true in the case of components formed on the same semiconductor substrate and sharing the same or substantially the same material structure (above). By subjecting several MMI components, or preferably the whole circuit, to the same strained film 407, all such performance issues can be corrected in a very efficient and simple, single method step, across the complete circuit 400. It is, of course, also possible to subject only some parts of the circuit 400 to the strained film, or to selectively apply certain layers of film, or certain etching steps, to only one or several parts or components on the same circuit 400.

It is preferred that at least two of the thus subjected couplers 402, 405 are formed on the same semiconductor substrate and share the same or substantially the same material structure, hence sharing the same or substantially the same substrate and material profile. This will result in predictable effects from the application of the strained film 407.

Figure 5:
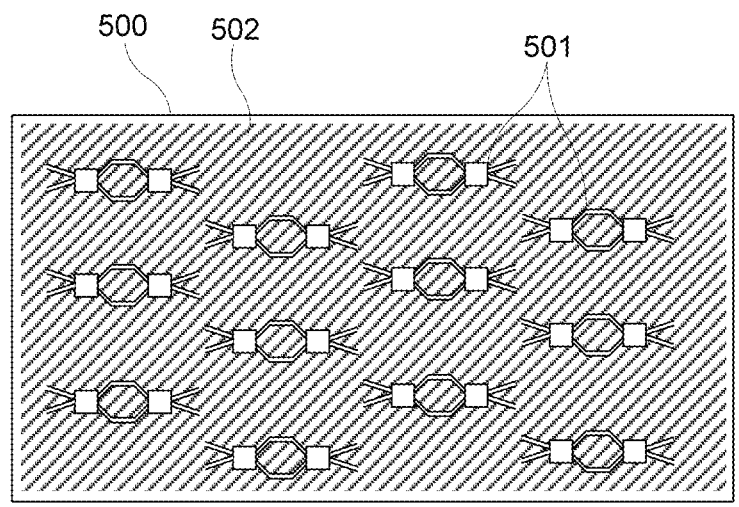
FIG. 5 is a simplified view of a semiconductor wafer according to the present invention, comprising several MMI couplers.

FIG. 5 shows a semiconductor wafer 500 comprising a plurality of integrated circuits 501 spread across its surface, each comprising at least one, preferably a plurality, of MMI couplers. It is realized that it is also possible that individual MMI components may be spread across the wafer 500 surface without being arranged in complete circuits. In a manner similar to the one described above with reference to FIG. 4, a film 502 of a strained material is applied to the wafer 500 surface, preferably partly or completely covering each of a plurality, more preferably partly or completely covering all, the circuits 501 or individual components, with similar advantages as described above.

The present invention can be applied without any modification of the standard fabrication sequence. For example, it is preferred that the film, apart from subjecting the MMI component surface to tension and/or compression forces, also serves as an insulating film that is deposited over the wafer to achieve other purposes, such as to provide electrical insulation between contact electrodes and the semiconductor surface in other parts of the optical device. Furthermore, the partial or complete removal of the film, by etching as described above, in the vicinity of the MMI component could be done at the same time as the film is cleared away from the top of some other semiconductor surfaces, to allow the formation of electrical contacts on those surfaces, while not making contacts on the surface of the MMI. In both of these examples, the utility of the film can be achieved without any changes in a standard optical device fabrication process sequence.

In the following, a detailed exemplary embodiment of the present invention will be described.

Hence, in a preferred embodiment, we consider a planar InP/InGaAsP-based semiconductor 2×2 MMI type optical coupler that is disposed on a planar InP substrate, where the 2×2 rectangular MMI region has a length of 221 μm along the direction of light propagation, and a width of 12.4 μm in the lateral direction, i.e. perpendicularly to the direction of light propagation. The two input and two output access port waveguides are symmetrically disposed about the MMI centerline, and have centerlines that are separated by a distance of 4.2 μm. The rectangular MMI shape and all of the input and output port waveguides are strongly laterally guided, and have lateral dimensions that have been defined by a 3 μm deep dry etch process. A stack of nominally unstrained layers of InGaAsP alloys and InP forms a vertical waveguide within the circuit that confines light to propagate in a plane that is parallel to the substrate surface, approximately 2 μm from the top surface of the circuit, and characterized by a slab or one-dimensional vertical waveguide effective refractive index of 3.27 at the illumination wavelength of 1.55 μm.

For an ideal 2×2 MMI coupler having the dimensions described above, light power that is launched into the fundamental mode in one of the input ports will be divided substantially equally between the two output ports. In other words, the power transmitted in the bar and cross state operation of the 2×2 MMI coupler is expected to be equal, or equivalently the ratio power transmission to the two output ports is expected to be 1.

However, if a wafer of optical circuits have been fabricated, and on-wafer testing reveals that the bar to cross state power splitting ratio of the 2×2 MMI couplers in a majority of the circuits on the wafer substantially exceeds 1, or if the circuits are characterized by a higher optical power loss in an optical path that precedes or follows one of the 2×2 MMI couplers in each circuit, such that a reduced bar to cross state power transmission ratio is required to advantageously alter the flow of optical power within the circuit, then a reduction in the bar to cross state power transmission would be desired.

To reduce the bar to cross state transmission, a planarizing polymer film of benzocyclobutene (BCB) was deposited on the wafer at 280° C., to cover the 2×2 MMI couplers. When the BCB film contracted, as the wafer was cooled to room temperature, the semiconductor surface was placed in tension, which resulted in a lateral profile of the refractive index within the MMI that provided a reduction of the bar to cross state transmission ratio of the 2×2 MMI's. The degree of reduction could have been modulated by the thickness of the BCB film, the film deposition conditions, or by restricting the extent of the film to cover only a portion of the MMI. In this manner, wafer-wide trimming of the circuit performance, and even trimming of the performance of individual circuits, was possible. The rectangular MMI having deeply etched sidewalls approximately 3 μm deep was covered by a planarizing BCB film with a total thickness of 5 μm above the surface where the deep dry etch terminated, in other words a BCB film that terminated 2 μm above the top surface of the MMI coupler. This way, a reduction in the bar to cross state power transmission ratio of approximately 20% was achieved.

Alternatively, a film material with the opposite sign of strain could have been applied, achieving an increase rather than a decrease in the bar to cross state power transmission ratio.

The invention claimed is:

1. A method for modifying a splitting or combining ratio of a first multimode interference (MMI) coupler, comprising:
    arranging the first coupler is arranged to convey light from one or several input waveguides to one or several output waveguides; and
    arranging a film of a material over the first coupler, the film being strained so that a permanent force is applied by said film to a surface of the first coupler resulting in a non-uniform mechanical stress field within the material of an MMI region of the coupler, so that a refractive index profile in a material of the first coupler changes as a consequence of said force,
    wherein said splitting or combining ratio is modified as a consequence of said changed refractive index profile.

2. The method according to claim 1, wherein the first coupler has two input waveguides and/or two output waveguides.

3. The method according to claim 1, wherein the modification of the splitting or combining ratio changes said splitting or combining ratio towards a value of 1.

4. The method according to claim 1, wherein the strained film extends laterally away from the first coupler.

5. The method according to claim 1, wherein the film is partly etched away after being arranged over the first coupler, so that said force after straining of the film material is different after said etching as compared to the same situation without etching.

6. The method according to claim 5, wherein said etching away comprises etching away the film completely over one or several certain areas of the first coupler.

7. The method according to claim 1, wherein the film in a first method step is arranged on the first coupler at a first temperature, and that the film, in a second method step, is then allowed to assume a second temperature, which is different from the first temperature, whereby the film expands or shrinks as a consequence of the change in temperature.

8. The method according to claim 1, wherein the film in a first method step, is arranged on the first coupler in liquid or solid form, and that, in a second method step, the film material is subjected to a processing step which permanently alters at least one material property whereby the film expands or shrinks as a consequence of the change in material property.

9. The method according to claim 1, wherein the film is arranged over the entire length, in the direction of light propagation, of the MMI region of the first coupler.

10. The method according to claim 1, wherein the first coupler is arranged as a part of an integrated optical circuit, which integrated optical circuit also comprises at least one second multimode interference coupler, arranged to convey light from one or several respective input waveguides to one or several respective output waveguides wherein a film of a material is arranged over all of said first and second couplers, after which the film is strained so that a force is applied by said film to the surface of each of the first and second couplers, and so that the refractive index profile in the respective material of the first and second couplers changes as a consequence of said force, and wherein said respective splitting or combining ratio is modified as a consequence of said respective changed refractive index profile.

11. The method according to claim 1, wherein the first coupler is arranged on a semiconductor wafer, which semiconductor wafer also comprises at least one second multimode interference coupler, arranged to convey light from one or several respective input waveguides to one or several respective output waveguides, wherein a film of a material is arranged over all of said first and second couplers on the wafer, after which the film is strained so that a force is applied by said film to the surface of each of the first and second couplers, and so that the refractive index profile in the respective material of the first and second couplers changes as a consequence of said force, and wherein said respective splitting or combining ratio is modified as a consequence of said respective changed refractive index profile.

12. The method according to claim 10, wherein the first coupler and the at least one second couplers are manufactured from the same material structure.

13. A multimode interference (MMI) coupler system, comprising:
   the coupler arranged to convey light from one or several input waveguides to one or several output waveguides; and
   a circuit which comprises a film of a strained material arranged over the coupler and arranged to permanently apply a force to a surface of the coupler, the force resulting in a non-uniform stress field with a material of an MMI region of the coupler, and so that a refractive index profile in a material of the coupler, and as a consequence also a splitting or combining ratio of the coupler, is different as a consequence of said force as compared to the case without said force.

14. The coupler system according to claim 13, wherein the coupler has two input waveguides and/or two output waveguides.

15. The coupler system according to claim 13, wherein the film is arranged to only partly cover the coupler.

16. The coupler system according to claim 13, wherein the coupler is part of an integrated optical circuit.

17. The coupler system according to claim 14, wherein the integrated optical circuit which, apart from said coupler, comprises at least one other multimode interference coupler, and wherein the film is arranged over both said coupler the at least one other coupler.

18. The coupler system according to claim 13, wherein the film material is a polymer which shrinks or expands with changing temperature.

19. The coupler system according to claim 13, wherein the film is arranged over the entire length, in the direction (D) of light propagation, of the MMI region of the coupler.

20. The method according to claim 11, wherein the first coupler and the at least one second couplers are manufactured from the same material structure.

* * * * *